United States Patent [19]
Latz

[11] Patent Number: 5,927,645
[45] Date of Patent: Jul. 27, 1999

[54] SHOVEL NOSE PNEUMATIC VORTEX CONTROL

[75] Inventor: John Paul Latz, Pasadena, Calif.

[73] Assignee: Northrop Grumman Corporation, Los Angeles, Calif.

[21] Appl. No.: 09/007,717

[22] Filed: Jan. 15, 1998

[51] Int. Cl.⁶ ................................................ B64C 7/00
[52] U.S. Cl. ................ 244/75 R; 244/199; 244/207
[58] Field of Search .............. 244/36, 199, 46, 244/75 R, 130, 207, 45 R, 45 A

[56] References Cited

U.S. PATENT DOCUMENTS

| | | | |
|---|---|---|---|
| 2,941,751 | 6/1960 | Gagarin | 244/199 |
| 3,090,584 | 5/1963 | Kuchemann et al. | 244/199 |
| 4,225,102 | 9/1980 | Rao | 244/130 |
| 4,691,879 | 9/1987 | Greene | 244/45 A |
| 4,786,009 | 11/1988 | Rao et al. | 244/75 |
| 4,896,846 | 1/1990 | Strom | 244/75 R |
| 5,050,819 | 9/1991 | Moskovitz | 244/75 R |
| 5,326,050 | 7/1994 | Zell | 244/75 R |
| 5,505,409 | 4/1996 | Wells et al. | 244/130 |

*Primary Examiner*—Galen L. Barefoot
*Attorney, Agent, or Firm*—Terry J. Anderson; Karl J. Hoch, Jr.

[57] ABSTRACT

A system for facilitating the enhanced aerodynamic control of an aircraft having a fuselage including a forebody defining a frontal portion adapted to create a primary vortex under certain flight conditions and a rear portion. The control system comprises a contour discontinuity which is formed between the frontal and rear portions of the forebody. The contour discontinuity is sized and configured to create a secondary vortex under certain flight conditions. In addition to the contour discontinuity, the control system comprises a pressurized fluid injecting device which is disposed within the forebody of the fuselage adjacent the contour discontinuity. The pressurized fluid injecting device is used to selectively manipulate the secondary vortex to control the flight performance characteristics of the aircraft.

14 Claims, 2 Drawing Sheets

SHOVEL NOSE PNEUMATIC VORTEX CONTROL

FIELD OF THE INVENTION

The present invention relates generally to air vehicles, and more particularly to an aerodynamic control system for facilitating the initiation and control of vortex patterns around the air vehicle.

BACKGROUND OF THE INVENTION

The operation of air vehicles, such as modern fighter aircraft, often requires flight at medium to high angles of attack. Under certain conditions while flying in this operating regime, the air vehicle aerodynamic control effectiveness, especially yaw control via the rudder of the air vehicle, is significantly reduced.

The concept of using pressurized fluidic jets or pneumatic jets to control the vortex pattern shed by the nose tip of an air vehicle forebody in order to provide aerodynamic control is known in the art. Under certain circumstances, especially when an air vehicle is flown at medium to high angles of attack, the nose tip of the air vehicle produces a vortex pattern on the leeward side of the forebody of the air vehicle. This vortex pattern results in air loads on the flying surfaces of the air vehicle. Previous pneumatic vortex control efforts focused at controlling this vortex pattern in order to manipulate vortex force and moment increments for aerodynamic control of the air vehicle. These efforts resulted in designs employing jets, nozzles, piping and other hardware associated with pressurized fluid delivery at or near the nose tip of the air vehicle forebody.

These conventional pneumatic vortex control schemes, however, result in negative impacts with regard to the performance of on-board nose-mounted air vehicle sensing devices. These sensing devices include, among others, radar, forward looking infrared sensors and electro-optical sensors. These conventional scheme necessarily require that the pressurized fluid delivery hardware be located at the nose of the forebody in order to control the nose tip induced vortex pattern. As a result, the close proximity of the pressurized fluid delivery hardware, such as jets, nozzles and piping, may significantly interfere with the performance and efficiency of the nose-mounted sensing devices.

In addition, the piping and other pressurized fluid delivery hardware impact the space requirements of the nose-mounted sensing devices.

These conventional schemes also significantly impact the observability or observable signature of the air vehicle itself. The pressurized fluid delivery hardware, especially jet nozzles, potentially contribute to the radar cross-section and the infrared signature of the forebody with regard to the front aspect of the air vehicle.

Further, the pressurized fluid delivery hardware of the conventional control schemes, especially vortex control jet nozzles, must be designed so as to reduce any aerodynamic penalty.

Accordingly, there exists a need in the art for a pneumatic vortex control system which does not significantly impact the performance of nose-mounted sensing devices, the space requirements of nose-mounted sensing devices, the observable signature of the air vehicle forebody and the aerodynamic characteristics of the air vehicle forebody.

SUMMARY OF THE INVENTION

In accordance with the present invention, there is provided a system for facilitating the enhanced aerodynamic control of an air vehicle such as an aircraft. The aircraft or other air vehicle with which the system of the present invention is preferably used has a fuselage including a forebody defining frontal and rear portions, with the frontal portion being adapted to create a primary vortex under certain flight conditions. The forebody of the fuselage also includes opposed sides defined by top and bottom longitudinal axes, with each of the sides of the forebody defining a side axis.

The aerodynamic control system of the present invention comprises a contour discontinuity which is formed between the frontal and rear portions of the forebody and is sized and configured to create a secondary vortex under certain flight conditions. The contour discontinuity itself preferably comprises a pair of stepped surfaces which are formed within respective ones of the sides of the fuselage and are sized and configured such that the maximum width of the frontal portion of the forebody at the stepped surfaces exceeds the maximum width of the rear portion of the forebody at the stepped surfaces. Additionally, each of the stepped surfaces is preferably formed so as to be of maximum width at a respective one of the side axes, and taper downwardly toward the top and bottom longitudinal axes.

In addition to the contour discontinuity, the aerodynamic control system comprises a pressurized fluid injecting device which is disposed within the forebody of the fuselage adjacent to or directly within the contour discontinuity, and is used to selectively manipulate the secondary vortex produced by the contour discontinuity for purposes of controlling the flight performance characteristics of the aircraft. In the preferred embodiment, the pressurized fluid injecting device comprises a pair of jets which are disposed within respective ones of the stepped surfaces and are adapted to direct pressurized fluid into the secondary vortex in a manner which preferably causes the secondary vortex to interact with the primary vortex.

In addition to the contour discontinuity and the pressurized fluid injecting device (i.e., jets), the control system of the present invention further includes a frontal pair of chine segments which extend laterally from the frontal portion of the forebody along respective ones of the side axes, and a rear pair of chine segments which extend laterally from the rear portion of the forebody along respective ones of the side axes. The distance of lateral protrusion of the frontal pair of chine segments at the stepped surfaces of the contour discontinuity preferably exceeds the distance of lateral protrusion of the rear pair of chine segments at the stepped surfaces.

Further in accordance with the present invention, there is provided a method for facilitating the enhanced aerodynamic control of an air vehicle such as an aircraft which has a fuselage including a forebody defining a frontal portion adapted to create a primary vortex under certain flight conditions and a rear portion. The method comprises the initial step of forming a contour discontinuity between the frontal and rear portions of the forebody, with the contour discontinuity being sized and configured to create a secondary vortex under certain flight conditions. The method further comprises the step of directing a pressurized fluid from a pressurized fluid injecting device disposed within the forebody of the fuselage adjacent the contour discontinuity into the secondary vortex to selectively manipulate the secondary vortex for controlling the flight performance characteristics of the aircraft. The pressurized fluid may be directed into the secondary vortex in either a symmetric or a non-symmetric manner, and is preferably used the cause the secondary vortex to interact with the primary vortex. The pressurized fluid directed into the secondary vortex preferably comprises air.

As is apparent from the foregoing description of the aerodynamic control system constructed in accordance with the present invention, such system seeks to initiate and then control a secondary vortex at some distance aft of the nose tip of the aircraft or other air vehicle. In this respect, the present control system begins with the chined configuration of the forebody as is typical on current "stealth" aircraft designs, with this chined configuration being modified so as to introduce the contour discontinuity between the frontal and rear portions of the forebody. As described above, the discontinuous planform defined by the contour discontinuity facilitates the initiation of the secondary vortex at that station of the fuselage when the aircraft is flying at a medium to high angle of attack. The drag on the aircraft attributable to the inclusion of the control system there within is minimized by insuring that the three-dimensional geometry of the contour discontinuity tapers to a relatively sharp chine line rather than leaving a blunt, aft-facing base area at the contour discontinuity. As also described above, subsequent to the initiation of the secondary vortex through the use of the contour discontinuity, high pressure air is injected at or near the contour discontinuity in order to control/manipulate the secondary vortex and its subsequent propagation aft along the fuselage and flying surfaces of the aircraft. This controlling jet of air can act to either strengthen or weaken the secondary vortex for purposes of altering the air loads imparted on the aircraft structure thereby which results in the force and moment increments required for enhanced aircraft control. Although the primary effect of the aerodynamic control system of the present invention is to produce a yawing moment when the jets are activated differentially, it can also produce pitching moments when activated symmetrically. The source of the high pressure air for the jets of the pressurized fluid injecting device of the present invention can be the compressor of the gas turbine engine used for main propulsion. Alternatively, the source may comprise a separate, smaller gas generator dedicated specifically to this task, or bottles which store a limited supply of high pressure gas. It will be recognized, however, that the source of the gas supply will typically be located at some distance from the actual controller jets, thus requiring some means of plumbing for gas delivery.

The aerodynamic control system constructed in accordance with the present invention presents numerous advantages not found in related prior art systems. In this respect, the present system is constructed so as to position the jets of the pressurized fluid injecting device aft away from the nose tip of the aircraft or air vehicle forebody, thereby reducing or eliminating interference with nose-mounted sensors, both in terms of performance and space requirements. Additionally, the jets are shielded or obscured by the contour discontinuity, thereby reducing or eliminating the frontal aspect observability contributions thereof to the overall signature of the aircraft or air vehicle. Since the jets are shielded by the contour discontinuity, the sizing thereof is not constrained by radar integration concerns, with the sizes of the jets being allowed to grow to accommodate the massflow required at a significantly lower pressure. Additionally, since the jets need not be shaped for radar concerns, they may be circularly configured, or made out of titanium, rather than composites, thus eliminating temperature restrictions on the delivered air. Further, the shielding of the jets results in a minimal impact thereof on the aerodynamic characteristics of the aircraft or air vehicle forebody.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
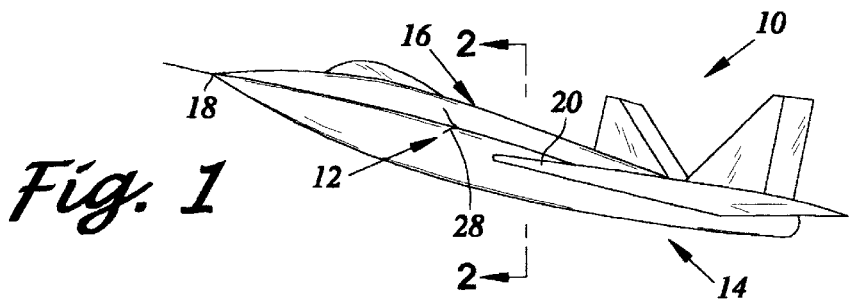
FIG. 1 is a perspective view of an aircraft incorporating the aerodynamic control system constructed in accordance with the present invention.

Referring now to the drawings wherein in the showings are for purposes of illustrating a preferred embodiment of the present invention only, and not for purposes of limiting the same, FIG. 1 perspectively illustrates an aircraft 10 which incorporates an aerodynamic control system 12 constructed in accordance with the present invention. The aircraft 10 shown in FIG. 1 is of the general genus of fighter or attack aircraft, and includes a fuselage 14 having a forebody 16 which extends from the nose tip 18 of the aircraft 10 to approximately the wings 20 thereof. The forebody 16 of the fuselage 14 itself defines a frontal portion 22 and a rear portion 24, with the frontal portion 22 defining the nose tip 18. In the aircraft 10, the frontal portion 22 of the forebody 16 is adapted to create a primary vortex under certain flight conditions. In particular, the primary vortex will typically be created by the frontal portion 22 on the leeward side of the forebody 16 when the aircraft 10 is operated at medium to high angles of attack. In addition to including the frontal and rear portions 22, 24, the forebody 16 has opposed sides which are defined by top and bottom longitudinal axes, with each of the sides defining a side axis.

As will be discussed in more detail below, the aerodynamic control system 12 of the present invention is designed to control the aircraft 10 in operating regimes that include sub-sonic velocities with respect to ambient air speed and in medium to high angles of attack. Those of ordinary skill in the art will recognize that the control system 12 as will hereinafter be described may be used in conjunction with aircraft other than for the aircraft 10, as well as other types of air vehicles including surface-to-air and air-to-air missiles.

Figure 2:
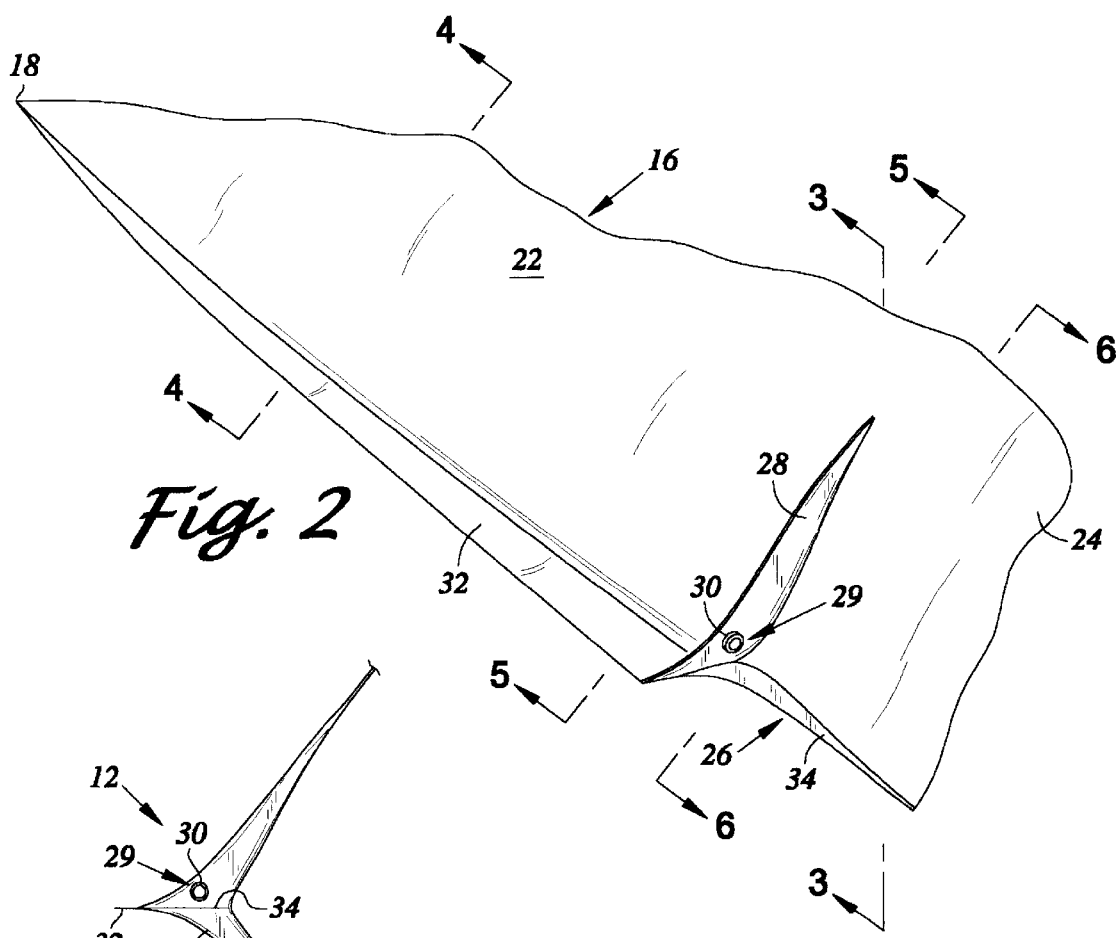
FIG. 2 is a partial perspective view of the forebody of the aircraft including the aerodynamic control system of the present invention taken along line 2—2 of FIG. 1.
Figure 3:
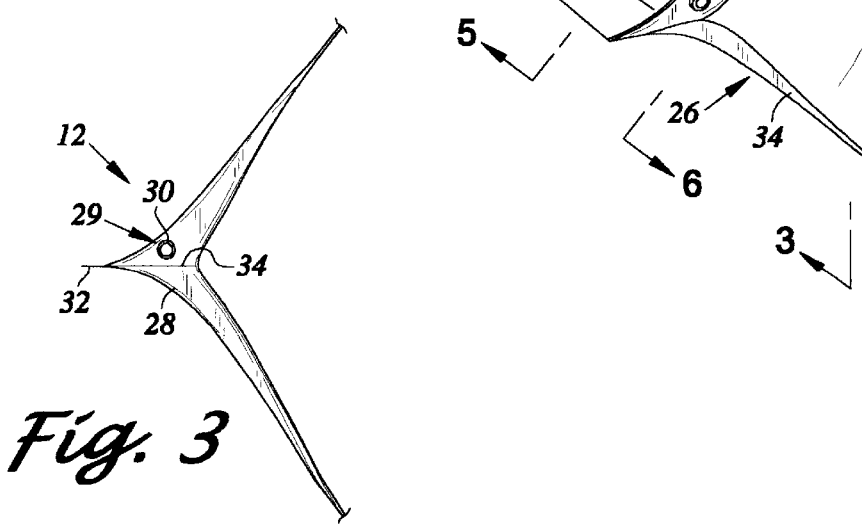
FIG. 3 is a cross-sectional view taken along line 3—3 of FIG. 2.

Referring now to FIGS. 2 and 3, the aerodynamic control system 12 constructed in accordance with the present invention preferably comprises a contour discontinuity 26 which is formed between the frontal and rear portions 22, 24 of the forebody 16. In the preferred embodiment, the contour discontinuity 26 comprises an opposed pair of identically configured stepped surfaces 28 which are formed within respective ones of the sides of the forebody 16 defined by the top and bottom longitudinal axes. The stepped surfaces 28 each have a generally planar configuration, and are sized and configured such that the maximum width of the frontal portion 22 of the forebody 16 at the stepped surfaces 28 exceeds the maximum width of the rear portion 24 at the stepped surfaces 28. As best seen in FIG. 3, each of the stepped surfaces 28 is itself formed to be of maximum width at a respective one of the side axes of the forebody 16, and to taper downwardly toward the top and bottom longitudinal axes thereof.

Importantly, the contour discontinuity 26, and more particularly the stepped surfaces 28, are adapted to create a secondary vortex along the fuselage 14 of the aircraft 10 under certain flight conditions. As with the primary vortex previously described, the secondary vortex created by the contour discontinuity 26 is typically formed on the leeward side of the aircraft 10 when the same is operated at medium to high angles of attack. The control system 12 of the present invention, in addition to creating the secondary vortex, is adapted to selectively manipulate the same for purposes of controlling the flight performance characteristics of the aircraft 10 as will also be described in more detail below.

It is contemplated that the surface transition form the forebody 16 to the stepped surfaces 28 may be relatively smooth (i.e., without sharp edges). Such smooth or rounded edges, as opposed to sharp edges, would mitigate drag at the forebody 16.

In addition to the contour discontinuity 26, the control system 12 of the present invention includes a pressurized fluid injecting device 29 which is disposed within the contour discontinuity 26 for purposes of manipulating the secondary vortex created thereby. In the preferred embodiment, the pressurized fluid injecting device 29 comprises a pair of circularly configured jets 30 which are disposed within respective ones of the stepped surfaces 28. As seen in FIGS. 2 and 3, each of the jets 30 is disposed within a respective stepped surface 28 so as to be oriented above and in close proximity to a respective side axis, thus resulting in the jets 30 being disposed closer to the top longitudinal axis of the forebody 16 than the bottom longitudinal axis thereof.

It is contemplated that, subsequent to the initiation of the secondary vortex through the use of the contour discontinuity 26, high pressure air is injected at or near the contour discontinuity 26 in order to control/manipulate the secondary vortex and its subsequent propagation aft along the fuselage 14 of the aircraft 10. High pressure air is injected through the use of a pressurized fluid injecting device 29, which in the preferred embodiment comprises a pair of jets 30. The injected pressurized air can act to either strengthen or weaken the secondary vortex for purposes of altering the air loads imparted on the structure of the aircraft 10 thereby resulting in the force and moment increments required for enhanced aircraft control. Although the primary effect of the aerodynamic control system of the present invention is to produce a yawing moment when the jets 30 are activated differentially, it can also produce pitching moments when activated symmetrically.

It is contemplated that via control of the injected pressurized fluid, the secondary vortex may be manipulated to interact with the primary vortex bring about desired aircraft control. Similarly, the secondary vortex may be manipulated to impart air loads on the aircraft 10 independent of interaction with the primary vortex.

Although the preferred embodiment of the present invention comprises a pair of jets 30, one skilled in the art will recognize that the pressurize fluid injecting device 29 may comprise a single concentrated jet, a plurality of jets, or a distributed sheet of jets along the contour discontinuity 26. Although in the preferred embodiment of the present invention the pair of jets 30 are located closer to the top longitudinal axis of the forebody 16 than the bottom longitudinal axis thereof, it is contemplated that the jets 30 may be located high or lower, including being located closer to the bottom longitudinal axis. It is also contemplated that the pair of jets 30 may be located adjacent to the contour discontinuity 26. It is further contemplated that the jets 30 may be movable and controllable.

The source of the high pressure air for the jets 30 of the pressurized fluid injecting device 29 of the present invention can be the compressor of the gas turbine engine used for main propulsion. Alternatively, the source may comprise a separate, smaller gas generator dedicated specifically to this task, or bottles which store a limited supply of high pressure gas. It will be recognized, however, that the source of the gas supply will typically be located at some distance from the actual controller jets, thus requiring some means of plumbing for gas delivery.

Although in the preferred embodiment, the pair of jets 30 are disposed within the contour discontinuity 26, it is contemplated that the pair of jets 30 may be located adjacent to the contour discontinuity 26. It is preferred that the jets be shielded or obscured by the contour discontinuity 26, so as to reduce or eliminate the frontal aspect observability contributions thereof to the overall signature of the aircraft 10. Since the jets 30 are shielded by the contour discontinuity 26, the sizing thereof is not constrained by radar integration concerns, with the sizes of the jets being allowed to grow to accommodate the massflow required at a significantly lower pressure. Additionally, since the jets need not be shaped for radar concerns, they may be circularly configured, or made out of titanium, rather than composites, thus eliminating temperature restrictions on the delivered air. Further, the shielding of the jets results in a minimal impact thereof on the aerodynamic characteristics of the aircraft or air vehicle forebody.

In addition to the contour discontinuity 26 (i.e., stepped surfaces 28) and pressurized fluid injecting device 29 (i.e., jets 30), the aerodynamic control system 12 of the present invention preferably includes a frontal pair of chine segments 32 which extend laterally from the frontal portion 22 of the forebody 16 along respective ones of the side axes. As is apparent from FIG. 2, the frontal pair of chine segments 32 extend from the nose tip 18 to the stepped surfaces 28 of the contour discontinuity 26. In addition to the frontal pair of chine segments 32, the control system 12 also includes a rear pair of chine segments 34 which extend laterally from the rear portion 24 of the forebody 16 along respective ones of the side axes. Because the frontal and rear pairs of chine segments 32, 34 are separated by the stepped surfaces 28 of the contour discontinuity 26, the distance of lateral protrusion of the frontal pair of chine segments 32 at the stepped surfaces 28 exceeds the distance of lateral protrusion of the rear pair of chine segments 34 at the stepped surfaces 28. Due to the protruding chine shape of the frontal portion 22 of the forebody 16, the aircraft 10 may be described as having a "shovel nose" geometry. As will be recognized, the frontal and rear pairs of chine segments 32, 34 provide the aircraft 10 with "stealth" characteristics. Those of ordinary skill in the art, however, will recognize that such frontal and rear pairs of chine segments 32, 34 need not necessarily be included in the control system 12 of the present invention.

Figure 4:
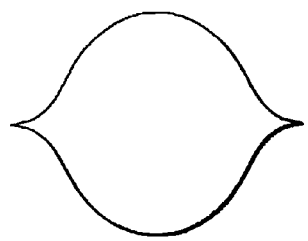
FIG. 4 is a cross-sectional view taken along line 4—4 of FIG. 2.
Figure 5:
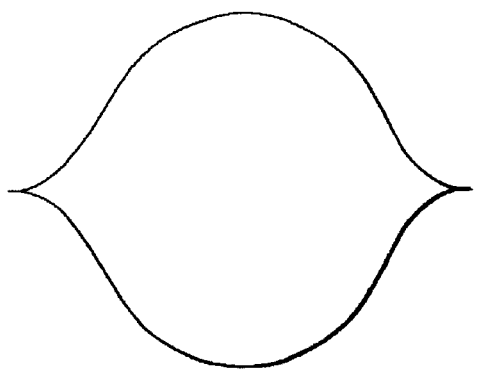
FIG. 5 is a cross-sectional view taken along line 5—5 of FIG. 2.
Figure 6:
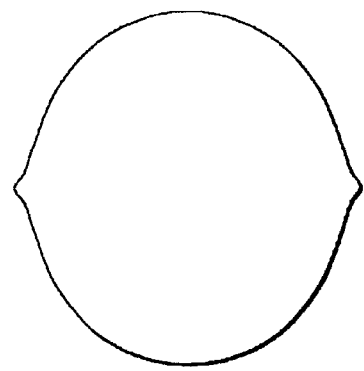
FIG. 6 is a cross-sectional view taken along line 6—6 of FIG. 2.

Numerous parameters may be varied to arrive at an optimum integration of the present invention with total air vehicle design. It is contemplated that the angle formed at the nose tip 18 of the aircraft 10, as observed from top and bottom views, may be varied. Referring now to FIG. 1, the vertical location of the chine line of the front and rear pairs of chine segments 32, 34, is depicted to be approximately at the mid point along the fuselage 14. It is contemplated that this vertical location may be varied. In addition, variations are contemplated of the width of the stepped surfaces 28 of the contour discontinuity 26, as defined by the difference of the distance of lateral protrusion of the frontal pair of chine segments 32 at the stepped surfaces 28 and the distance of lateral protrusion of the rear pair of chine segments 34 at the stepped surfaces 28. The stepped surfaces 28 in relation to the respective ones of the frontal pair of chine segments 32 in a horizontal plane define an angle. Referring now to FIG. 2, the described horizontal angle is depicted to be approximately 90 degrees. It is contemplated that this angle may be varied. In addition, as best observed in FIGS. 5 and 6, the relative sharpness of the chine line of both the frontal and rear pairs of chine segments 34, 36, may be varied. Furthermore, it is contemplated that the relative sharpness of the chine line of the frontal pair of chine segments 34 may varied along its respective length, as depicted in FIGS. 4 and 5.

Further in accordance with the present invention, there is provided a method for facilitating the enhanced aerodynamic control of an air vehicle such as an aircraft 10 which has a fuselage 14 including a forebody 16 defining a frontal portion 22 adapted to create a primary vortex under certain flight conditions and a rear portion 24. The method comprises the initial step of forming a contour discontinuity 26 between the frontal and rear portions 22, 24, of the forebody 16, with the contour discontinuity 26 being sized and configured to create a secondary vortex under certain flight conditions. The method further comprises the step of directing a pressurized fluid from a pressurized fluid injecting device 29 disposed within the forebody 16 of the fuselage 14 adjacent the contour discontinuity 26 into the secondary vortex to selectively manipulate the secondary vortex for controlling the flight performance characteristics of the aircraft. The pressurized fluid may be directed into the secondary vortex in either a symmetric or a non-symmetric manner, and is preferably used the cause the secondary vortex to interact with the primary vortex. The pressurized fluid directed into the secondary vortex preferably comprises air.

What is claimed is:

1. In an aircraft having a fuselage including a forebody defining a frontal portion adapted to create a primary vortex under certain flight conditions and a rear portion, a system for facilitating enhanced aerodynamic control of the aircraft comprising:
   a contour discontinuity formed between the frontal and rear portions of the forebody, said contour discontinuity being sized and configured to create a secondary vortex under certain flight conditions; and
   a pressurized fluid injecting device disposed within the forebody of the fuselage adjacent the contour discontinuity for selectively manipulating the secondary vortex to control the flight performance characteristics of the aircraft.

2. The aerodynamic control system of claim 1 wherein the forebody of the fuselage includes opposed sides defined by top and bottom longitudinal axes and the contour discontinuity comprises a pair of stepped surfaces formed within respective ones of the sides, said stepped surfaces being sized and configured such that the maximum width of the frontal portion of the forebody at the stepped surfaces exceeds the maximum width of the rear portion of the forebody at the stepped surfaces.

3. The aerodynamic control system of claim 2 wherein each of the sides of the forebody defines a side axis, and each of the stepped surfaces is formed to be of maximum width at a respective one of the side axes and taper downwardly to the top and bottom longitudinal axes.

4. The aerodynamic control system of claim 3 further comprising:

a frontal pair of chine segments extending laterally from the frontal portion of the forebody along respective ones of the side axes; and
   a rear pair of chine segments extending laterally from the rear portion of the forebody along respective ones of the side axes;
   the distance of lateral protrusion of the frontal pair of chine segments at the stepped surfaces exceeding the distance of lateral protrusion of the rear pair of chine segments at the stepped surfaces.

5. The aerodynamic control system of claim 2 wherein the pressurized fluid injecting device is disposed within at least one of the stepped surfaces.

6. The aerodynamic control system of claim 5 wherein the pressurized fluid injecting device comprises a pair of jets disposed within respective ones of the stepped surfaces.

7. The aerodynamic control system of claim 1 wherein the pressurized fluid injecting device is disposed within the contour discontinuity.

8. The aerodynamic control system of claim 1 wherein the pressurized fluid injecting device is adapted to direct pressurized fluid into the secondary vortex in a manner which causes the secondary vortex to interact with the primary vortex.

9. In an air vehicle having a fuselage including a forebody defining a frontal portion adapted to create a primary vortex under certain flight conditions and a rear portion, a system for facilitating enhanced aerodynamic control of the air vehicle, comprising:
   a contour discontinuity formed between the frontal and rear portions of the forebody, said contour discontinuity being sized and configured to create a secondary vortex under certain flight conditions; and
   a pressurized fluid injecting device disposed within the fuselage body adjacent the contour discontinuity for selectively manipulating the secondary vortex to control the flight performance characteristics of the air vehicle.

10. A method for facilitating enhanced aerodynamic control of an aircraft having a fuselage including a forebody defining a frontal portion adapted to create a primary vortex under certain flight conditions and a rear portion, said method comprising the steps of:
   (a) forming a contour discontinuity between the frontal and rear portions of the forebody, said contour discontinuity being sized and configured to create a secondary vortex under certain flight conditions; and
   (b) directing a pressurized fluid from a pressurized fluid injecting device disposed within the forebody of the fuselage adjacent the contour discontinuity into the secondary vortex to selectively manipulate the secondary vortex to control the flight performance characteristics of the aircraft.

11. The method of claim 10 wherein step (b) comprises directing the pressurized fluid into the secondary vortex in a non-symmetric manner.

12. The method of claim 10 wherein step (b) comprises directing the pressurized fluid into the secondary vortex in a symmetric manner.

13. The method of claim 10 wherein step (b) comprises directing the pressurized fluid into the secondary vortex in a manner which causes the secondary vortex to interact with the primary vortex.

14. The method of claim 10 wherein step (b) comprises directing pressurized air into the secondary vortex.

* * * * *